3,274,031
FUEL CELL ELECTRODE AND METHODS OF PREPARATION
Henri J. R. Maget, Marblehead, and Gerald Frank Wheeler, Salem, Mass., assignors to General Electric Company, a corporation of New York
No Drawing. Filed Aug. 7, 1963, Ser. No. 300,692
20 Claims. (Cl. 136—120)

This invention relates to fuel cell electrodes and to methods for their preparation.

Fuel cell electrodes which operate on gaseous fuels require a three-zone interface on the surface, where solid, liquid and gas phases interact in the electrochemical process. When such electrodes have a porous structure, capillary forces are critical and the pressures must be closely adjusted to retain the proper interface area. Catalysts composed of noble metals are normally utilized to form such electrodes, particularly when a highly corrosive electrolyte, such as sulfuric acid, is to be used, so that the electrode cost for an operational fuel cell is extremely high. In addition, it is necessary that the electrode not only be catalytic, but electrically conducting as well. Thus, the base for the catalytic material must be carefully chosen.

The prior art contains many patents showing the preparation of catalysts by the blending of two or more metals, followed by the removal of the more soluble metal through the action of a strong acid or base. Typical of such prior art materials are the Raney nickel catalysts which result in a skeletal structure. Further, the preparation of a platinum metal catalyst by the formation of an alloy of platinum with a base metal and the subsequent dissolution of the base metal with hydrochloric acid solution has been shown. This, too, results in a skeletal structure.

Electrodes having rough surfaces have also been shown in the prior art. For example, an electrode presenting a pebbled appearance was shown to be produced by the electrodeposition of a palladium salt from solution onto a supporting base. Here, a significant thickness of relatively pure palladium is required to form the electrode structure. Not only the electrode surface, but a layer between the surface and the supporting base must be formed entirely of expensive noble metal. Further, the base itself may be formed of a noble gauze; the structure, therefore, represents a significant cost. A catalyst formed by coating a mixture of metal salts and metal powders onto a base and the subsequent reduction of the mixture to form a catalytic surface having crevices and cracks has also been described. However, as in the case of Raney nickel, the catalytic surface is skeletal.

Platinum catalysts supported on substrates have been shown. However, these substrates are generally non-conductive materials such as kieselguhr, so that the electrical conductivity necessary for the operation of a fuel cell is not present. Many of the noble metal catalysts shown in the prior art are for use in hydrogenation reactions and are highly hydrogen charged. Such catalysts are unstable in the presence of air and must be kept under a liquid phase.

On the other hand, the catalyst of the present invention is for use in a cathode of a fuel cell, where it causes the reduction of oxygen, either alone or mixed with other gases, as in air. The catalyst is in the form of an integral particle, the base of which is a conducting core containing a small amount of noble metal, and the surface of which has a plurality of minute asperities lined with a significant amount of active noble metal. The asperitied structure offers much less resistance to gas flow and, in comparison with skeletal structures bonded with polytetrafluoroethylene, the electrical conductivity is significantly higher. Thus, the catalyst structure of the present invention is significantly different than the skeletal structures shown in the prior art. This difference in structure, to a high degree, overcomes the problem of the high cost of noble metal catalysts.

It is, therefore, one object of this invention to produce a noble metal catalyst electrode which requires a relatively small amount of the noble metal.

It is a further object of this invention to provide a catalyst formed by the removal of base metal, from an alloy of a noble metal with base metal, only at the surface of a structure, so that fine surface asperities result.

It is a still further object of the invention to produce a surface-active noble metal catalyst which is integral with an electrically conducting core.

A further object of this invention is to provide an improved method for forming a surface-active noble metal catalyst for use in a fuel cell electrode.

Briefly, the present invention relates to the formation of a catalyst for a fuel cell electrode from particles of an alloy of a noble metal, such as platinum, with a base metal, such as titanium. Other noble metals which may be used are palladium, iridium, and rhodium. In another embodiment, the alloy may also contain an additional corrosion-resistant metal. Examples of such corrosion-resistant metals which are useful in the present invention are tantalum, tungsten, zirconium, niobium, and molybdenum. The purpose of the corrosion-resistant metal, if used, is to improve further the corrosion resistance of the electrode by replacing a portion of the base with another metal which is both electrically conductive and corrosion-resistant. The corrosion-resistant metal in this case acts essentially as an inert metal binder for the noble metal catalyst.

The active noble metal catalyst material need only be present at the surface of the particle. This is achieved, in accordance with one embodiment of this invention, by etching the alloy particle with hydrofluoric acid solution to remove the base metal constituents from only the surface. Since both the noble metal and the corrosion-resistant metal are practically insoluble in hydrofluoric acid, essentially only the titanium is removed from the surface and a plurality of minute asperities result. The removal of the titanium from the surface of the particles leaves the walls of the minute asperities lined with active noble metal. Thus, the percentage of active noble metal at the surface is significantly increased, as compared with the total percentage of noble metal in the over-all alloy. The result is a significant decrease in the amount of expensive noble metal needed for a given catalytic activity.

The surface asperities on the particle of the present invention become channelling to gas transport, so that the surface does not create a barrier to gas migration or diffusion. Thus, while the three-zone interface must still be retained, the capillary forces are not critical for cell operation, and the pressures need not be so closely controlled, provided the gas-liquid interface is present in the electrode matrix.

By integrating the currents generated in a plurality of small asperities, high current density per unit geometric area is possible. Where the asperities are of atomic cross-section, it is theoretically possible to generate $10^{13}$ contacts/cm.$^2$. More realistically, where the asperities have diameters of about 1 micron, $10^7$ contacts/cm.$^2$ can be obtained.

Thus, the formation of asperities on the surface of a catalytic particle results not only in a more desirable flow through and across the electrode, but, in addition, produces a high current density per unit area.

Fuel cell electrodes are formed from the alloy particles. In one method, the particles are bonded into a structure utilizing a permeable, water-resistant plastic binder. An example of such a binder is polytetrafluoroethylene. The particles may be etched either before or after bonding. In another method, the unetched particles may be sintered under the action of heat and pressure. The particles in the sintered structure are then etched and the structure coated on one side with a permeable, water-resistant binder. The structure produced by this method possesses significant advantages over structures formed by the sintering of normal particles. As a portion of the titanium remains, even after etching, the catalyst requires no additional activation. Preferential etching, rather than random etching, is accomplished and the asperities become an integral part of each particle. Thus, the particles remain channelling to gas flow and do not require the critical control of capillary forces and structures necessary in porous structures.

The titanium is a requirement in each type of catalyst particle in that it aids in activating the catalyst. Further, the titanium does not significantly diminish the conductivity of the finally formed structure and is corrosion resistant. While the titanium may be removed under the action of hydrofluoric acid, in combination with the noble metal it resists the corrosive attack of other materials.

The fuel cell electrodes produced by the methods just described are useful in the reduction of gaseous oxygen, either alone or mixed with other gases, such as in air, at the cathode side of a fuel cell. This oxygen accepts the electrons transferred through an external circuit from the anode side of the fuel cell, and combines with the cations produced at the anode side of the cell to balance the chemical and electrical relationships.

The amount of active noble metal in the original catalyst alloy is preferably between about 4% and 10%. The remainder, in the binary alloy, is substantially all titanium. For the ternary alloy, containing an additional corrosion-resistant metal, the percentage of noble metal is preferably the same. The titanium in such a system may range from 25% to 50%, the remainder being substantially all corrosion-resistant metal, such as tantalum.

The suggested percentages are for maximum utilization of the expensive noble metal catalyst material without a significant decrease in the performance of the electrode. Thus, the lowest range of noble metal suggested, will give the lowest cost per pound of catalyst alloy, without seriously impairing the current generation capabilities of the fuel cell electrode. Alloys having noble metal contents of up to 25% have been produced in accordance with this invention.

The particle size of the alloy to be etched is preferably about 40 microns, with a preferred range of about 14 to 44 microns. The surface area of such a particle is approximately one meter$^2$/gm. prior to etching. After etching a material containing about 10% noble metal will have a surface area of approximately 20 meter$^2$/gm. The exposed surface of the etched particle may contain more than 90% noble metal catalyst material.

As representative of the formulations of the alloys utilized in the present invention prior to etching, the following are noted:

| Titanium | Tantalum | Platinum | Palladium |
|---|---|---|---|
| 25 | 65 | 10 | |
| 46 | 50 | 4 | |
| 93 | | 7 | |
| 95 | | | 5 |
| 90 | | | 10 |
| 43 | 50 | 7 | |
| 45 | 45 | 10 | |
| 40 | 50 | 10 | |

The following table shows the IR-free voltage for electrodes produced according to the present invention as compared with a pure platinum skeletal electrode:

| Material | IR-Free Voltage at 20° C. in Volts at Current Density | |
|---|---|---|
| | 50 Milliamperes per cm.$^2$ | 100 Milliamperes per cm.$^2$ |
| Platinum Black | .85 | .82 |
| 93 Ti–7 Pt | .64 | .59 |
| 45 Ti–45 Ta–10 Pt | .71 | .63 |
| 45 Ti–45 Ta–10 Pt | .73 | .70 |
| 43 Ta–50 Ta–7 Pt | .72 | .56 |
| 40 Ti–50 Ta–10 Pt | .73 | .63 |

It can easily be seen from this data that the use of from 7% to 10% platinum, by the method of the present invention, will produce a voltage of from 68% to 86% of that obtainable by pure platinum.

The IR-free voltage is a measurement of the true potential of the electrode without the effect of internal cell resistance. Since the internal resistance is not a part of the present development, an indication of the IR-free voltage, which removes the effects of the internal cell resistance, gives a more accurate picture of the capabilities of the materials of the present development.

As indicated, the performance data shown above is at 20° C. (room temperature). At higher temperatures significantly better performance has been demonstrated. In addition, many of the electrodes have been operated for up to 3,000 hours without a significant decrease in the performance level. This is particularly important in the development of a practical fuel cell.

The following are examples of methods of producing the electrodes of the present invention:

Example I

An alloy containing 45% titanium, 45% tantalum, and 10% platinum was formed into particles having a maximum particle size of 40 microns. The dry particles were spread onto a mold and cold-pressed on a pre-cut tantalum screen. An electrode was formed by hot-pressing the materials between aluminum sheets and removing the aluminum by dissolution in sodium hydroxide. The electrode was etched eight minutes in a solution containing 3.5 cc. of hydrogen fluoride in 20 cc. of water. The reaction area was then flooded with a large excess of water. After being thoroughly rinsed, the electrode was dried in an oven at 212° F. for two hours. It is essential that the rinsing be thorough, as metal fluorides have a detrimental effect on the functioning of the electrode. The weight loss of the electrode was determined to be 48.3% and contained 99% of the titanium present in the original alloy. The remainder of the weight loss was the result of dissolution of tantalum. A thin film of polytetrafluoroethylene was coated on one side of the electrode to provide water repellancy and, after drying, the structure was tested for electrical properties as the oxygen electrode of a hydrogen-oxygen fuel cell utilizing a 20–30% sulfuric acid electrolyte. The gas flow was directed at the polytetrafluoroethylene coated side of the electrode so that any product water formed would drain off promptly. The IR-free voltage showed the following values at the designated current densities:

| Current density milliamperes/cm.$^2$: | IR-free voltage, volts |
|---|---|
| 25 | .77 |
| 50 | .73 |
| 100 | .70 |
| 195 | .68 |

Example II

An electrode was prepared as described in Example I, except that one of the aluminum sheets had a polytetrafluoroethylene film sprayed on it. After dissolving the aluminum from the electrode structure, the unetched electrode had a thin polytetrafluoroethylene film on one surface. The electrode was subjected to the action of a solution containing 3 cc. of hydrogen fluoride and 20 cc. of water for five minutes. The electrode showed a weight loss of 24.2% of which approximately 80% was titanium, the remainder being tantalum. After the electrode structure was flooded with water and thoroughly rinsed and dried, it was placed in a fuel cell apparatus to determine its electrical characteristics. The fuel cell utilized hydrogen and oxygen gases as fuels and a 20–30% solution of sulfuric acid as the electrolyte. The following results were obtained:

| Current density, milliamperes/cm.$^2$: | IR-free voltage, volts |
|---|---|
| 25 | .75 |
| 50 | .71 |
| 75 | .67 |
| 100 | .63 |
| 125 | .58 |
| 150 | .55 |

*Example III*

An alloy powder containing 45% titanium, 45% tantalum, and 10% platinum was etched for 70 minutes with a solution containing 13.1 cc. of hydrogen fluoride in 100 cc. of water. The etching solution was diluted with water and the etched particles filtered from the solution using a sintered glass filter. The material was then washed thoroughly in 500 cc. of distilled water and dried as in Example I. The etched particles were then mixed with a 10% polytetrafluoroethylene aqueous emulsion. As thin a film of the mixture as possible was formed on a metal foil casting surface. The water was evaporated from the emulsion and the polytetrafluoroethylene was sintered under pressure. The electrode was removed from the casting surface and cut into the desired shape. This produced a gas permeable, electronically conductive, hydrophobic electrode, having high mechanical strength, without further processing. The process of forming the electrode from the etched particles is described with greater detail in the co-pending application of Leonard W. Niedrach, Serial No. 108,418, filed May 8, 1961, and assigned to the same assignee as the present invention. The following data were observed when the electrode was placed in a hydrogen-oxygen fuel cell apparatus utilizing a 20–30% solution of sulfuric acid as an electrolyte:

| Current denity, milliamperes/cm.$^2$: | IR-free voltage, volts |
|---|---|
| 25 | .78 |
| 50 | .72 |
| 100 | .57 |

*Example IV*

8 grams of a 325 mesh powder of a 93% titanium-7% platinum alloy were placed in a 3% solution of hydrofluoric acid. After three minutes the sample was washed with water to slow down the reaction. The powder was then filtered from the solution and washed until the filter water was clean. After drying, the etched powder was mixed with a 10% polytetrafluoroethylene aqueous emulsion for the formation of an electrode by the method described in Example III. An electrode about ⅞ inch in diameter and approximately 15 mils thick was placed in a test apparatus with the plastic film on the gas side of the electrode. The test apparatus contained a 20–30% solution of sulfuric acid as an electrolyte and utilized hydrogen and oxygen gas as fuels. Under those conditions, the following results were obtained:

| Current density, milliamperes/cm.$^2$: | IR-free voltage, volts |
|---|---|
| 25 | .69 |
| 50 | .68 |
| 100 | .59 |

It will thus be noted from the above examples that at least four methods are available for preparing the electrodes of the present invention:

(1) Sintering the unetched particles, etching, and applying a permeable water-resistant binder.

(2) Sintering the particles, applying a permeable water-resistant plastic film, and etching.

(3) Etching the particles and forming an electrode from a mixture of the etched particles and a permeable, water-resistant plastic film. Any of these methods is equally applicable to the binary or to the ternary alloy systems described.

(4) Embedding the unetched particles in a permeable water-resistant plastic film and etching.

In addition to the materials previously mentioned as constituents of the alloy, other materials which increase the resistance of the material to corrosion and oxidation may be utilized. For example, elemental carbon or carbides could be added to the alloy metal. The type of material and the amount used would be controlled by the electrical conductivity requirements of the electrode and by the corrosion and oxidation resistance to be achieved.

While specific embodiments of the invention have been shown and described, the invention should not be limited to the particular formulas and methods. It is intended, therefore, by the appended claims, to cover all modifications within the spirit and scope of this invention.

What is claimed as new and desired to be secured by Letters Patent of the United States is:

1. A fuel cell electrode formed of a plurality of catalyst particles consisting essentially of titanium and at least one noble metal selected from the group consisting of platinum, palladium, iridium, and rhodium, each of said particles having a plurality of asperities formed in the surface thereof by the removal of a portion of said titanium, said asperities containing a predominant amount of said noble metal in an active condition, said particles, prior to the formation of said asperities, consisting essentially of from 4–25% of at least one of said noble metals and the remainder titanium.

2. The fuel cell electrode of claim 1 wherein the noble metal is platinum.

3. The fuel cell electrode of claim 1 wherein the noble metal is palladium.

4. A fuel cell electrode formed of a plurality of catalyst particles consisting essentially of titanium and at least one noble metal selected from the group consisting of platinum, palladium, iridium, and rhodium, each of said particles having a plurality of asperities formed in the surface thereof by the removal of a portion of said titanium, said asperities containing a predominant amount of said noble metal in an active condition, said particles, prior to the formation of said asperities, consisting essentially of from 4–25% of at least one of said noble metals and the remainder titanium, said particles being bonded by a permeable, water-resistant, plastic binder.

5. A fuel cell electrode formed of a plurality of catalyst particles consisting essentially of titanium, a corrosion-resistant metal selected from the group consisting of tantalum, zirconium, niobium, tungsten, and molybdenum, and at least one noble metal selected from the group consisting of platinum, palladium, iridium, and rhodium, each of said particles having a plurality of asperities formed in the surface thereof primarily by the removal of a portion of said titanium, said asperities containing a predominant amount of said noble metal in an active condition, said particles, prior to the formation of said asperities, consisting essentially of from 25–50% titanium, from 4–25% of at least one of said noble metals and the remainder corrosion-resistant metal.

6. The fuel cell electrode of claim 5 wherein the corrosion-resistant metal is tantalum.

7. The fuel cell electrode of claim 6 wherein the noble metal is platinum.

8. The fuel cell electrode of claim 6 wherein the noble metal is palladium.

9. A fuel cell electrode formed of a plurality of catalyst particles consisting essentially of titanium, a corrosion-resistant metal selected from this group consisting of tantalum, zirconium, niobium, tungsten, and molybdenum, and at least one noble metal selected from the group consisting of platinum, palladium, iridium, and rhodium, each of said particles having a plurality of asperities formed in the surface thereof primarily by the removal of a portion of said titanium, said asperities containing a predominant amount of said noble metal in an active condition, said particles, prior to the formation of said asperities, consisting essentially of from 25–50% titanium, from 4–25% of at least one of said noble metals, and the remainder corrosion-resistant metal, said particles being bonded by a permeable, water-resistant, plastic binder.

10. A method for forming a catalytic fuel cell electrode including:
(1) preparing an alloy consisting essentially of from 4–25% of at least one noble metal selected from the group consisting of platinum, palladium, iridium, and rhodium and the remainder titanium,
(2) forming said alloy into particles,
(3) etching the surface of said particles with hydrofluoric acid to remove at least a portion of said titanium from said surface so as to produce a plurality of asperities containing a predominant amount of said noble metal in an active condition, and
(4) binding the particles with polytetrafluoroethylene film to form an electrode structure.

11. The method of claim 10 wherein the noble metal is platinum.

12. The method of claim 10 wherein the noble metal is palladium.

13. A method for forming a catalytic fuel cell electrode including:
(1) preparing an alloy consisting essentially of from 25–50% titanium, from 4–25% of at least one noble metal selected from the group consisting of platinum, palladium, iridium, and rhodium and the remainder corrosion-resistant metal selected from the group consisting of tantalum, zirconium, niobium, tungsten, and molybdenum,
(2) forming said alloy into particles,
(3) etching the surface of said particles with hydrofluoric acid to remove at least a portion of said titanium from said surface so as to produce a plurality of asperities containing a predominant amount of said noble metal in an active condition, and
(4) binding the etched particles with a polytetrafluoroethylene film to form an electrode structure.

14. The method of claim 13 wherein the corrosion-resistant metal is tantalum.

15. The method of claim 14 wherein the noble metal is platinum.

16. The method of claim 14 wherein the noble metal is palladium.

17. A method for forming a catalytic fuel cell electrode including:
(1) preparing an alloy consisting essentially of from 4–25% of at least one noble metal selected from the group consisting of platinum, palladium, iridium, and rhodium and the remainder titanium,
(2) forming said alloy into particles,
(3) embedding said particles in a thin polytetrafluoroethylene film, and
(4) contacting said film with hydrofluoric acid to etch the surface of said particles so as to remove at least a portion of said titanium from said surface so as to produce a plurality of asperities containing a predominant amount of said noble metal in an active condition.

18. A method for forming a catalytic fuel cell electrode including:
(1) preparing an alloy consisting essentially of from 25–50% titanium, from 4–25% of at least one noble metal selected from the group consisting of platinum, palladium, iridium, and rhodium, and the remainder corrosion-resistant metal selected from the group consisting of tantalum, zirconium, niobium, tungsten, and molybdenum,
(2) forming said alloy into particles,
(3) embedding said particles in a thin polytetrafluoroethylene film, and
(4) contacting said film with hydrofluoric acid to etch the surface of said particles so as to remove at least a portion of said titanium from said surface so as to produce a plurality of asperities containing a predominant amount of said noble metal in an active condition.

19. A method for forming a catalytic fuel cell electrode including:
(1) preparing an alloy consisting essentially of from 4–25% of at least one noble metal selected from the group consisting of platinum, palladium, iridium, and rhodium and the remainder titanium,
(2) forming said alloy into particles,
(3) sintering said particles to form an electrode structure,
(4) contacting said structure with hydrofluoric acid to etch the surface of said particles so as to remove at least a portion of said titanium from said surface so as to produce a plurality of asperities containing a predominant amount of said noble metal in an active condition and,
(5) forming a polytetrafluoroethylene film over said structure.

20. A method for forming a catalytic fuel cell electrode including:
(1) preparing an alloy consisting essentially of from 25–50% titanium, from 4–25% of at least one noble metal selected from the group consisting of platinum, palladium, iridium, and rhodium, and the remainder corrosion-resistant metal selected from the group consisting of tantalum, zirconium, niobium, tungsten, and molybdenum,
(2) forming said alloy into particles,
(3) sintering said particles to form an electrode structure,
(4) contacting said structure with hydrofluoric acid to etch the surface of said particles so as to remove at least a portion of said titanium from said surface so as to produce a plurality of asperities containing a predominant amount of said noble metal in an active condition, and
(5) forming a polytetrafluoroethylene film over said structure.

References Cited by the Examiner
UNITED STATES PATENTS 2,641,623  6/1953  Winckler et al. _____ 136—121
2,824,165  2/1958  Marsal _____ 136—122

WINSTON A. DOUGLAS, *Primary Examiner.*

A. SKAPARS, *Assistant Examiner.*